United States Patent
Baba et al.

(10) Patent No.: US 9,381,497 B2
(45) Date of Patent: Jul. 5, 2016

(54) CATALYZED PARTICULATE FILTER

(75) Inventors: Takashi Baba, Hiroshima (JP);
Koichiro Harada, Hiroshima (JP);
Hiroshi Yamada, Hiroshima (JP);
Masahiko Shigetsu, Higashi-Hiroshima (JP); Akihide Takami, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 323 days.

(21) Appl. No.: 14/346,936

(22) PCT Filed: Aug. 1, 2012

(86) PCT No.: PCT/JP2012/004877
§ 371 (c)(1),
(2), (4) Date: Mar. 24, 2014

(87) PCT Pub. No.: WO2013/042300
PCT Pub. Date: Mar. 28, 2013

(65) Prior Publication Data
US 2014/0205508 A1    Jul. 24, 2014

(30) Foreign Application Priority Data
Sep. 22, 2011 (JP) .................... 2011-207774

(51) Int. Cl.
*B01J 23/63* (2006.01)
*B01D 53/94* (2006.01)
(Continued)

(52) U.S. Cl.
CPC .............. *B01J 23/63* (2013.01); *B01D 53/944* (2013.01); *B01J 23/002* (2013.01); *B01J 35/002* (2013.01); *B01J 35/0006* (2013.01); *B01J 35/023* (2013.01); *B01J 35/04* (2013.01); *B01J 37/031* (2013.01); *F01N 3/10* (2013.01); *B01D 2255/1021* (2013.01); *B01D 2255/1025* (2013.01); *B01D 2255/2065* (2013.01); *B01D 2255/2066* (2013.01); *B01D 2255/2068* (2013.01); *B01D 2255/2092* (2013.01);
(Continued)

(58) Field of Classification Search
None
See application file for complete search history.

(56) References Cited

U.S. PATENT DOCUMENTS 4,504,598 A * 3/1985 Ono ............... B01D 53/945
                                                 D53/945
2008/0207438 A1    8/2008 Suzuki et al.
(Continued)

FOREIGN PATENT DOCUMENTS

EP        1598104 A1      11/2005
JP      2005-329318 A     12/2005
(Continued)

OTHER PUBLICATIONS

International Search Report; PCT/JP2012/004877; Sep. 25, 2012.

*Primary Examiner* — Walter D Griffin
*Assistant Examiner* — Jelitza Perez
(74) *Attorney, Agent, or Firm* — Studebaker & Brackett PC

(57) ABSTRACT

A filter is configured for efficient combustion of particulates accumulated on a catalyst layer 7 in both a rapid combustion range and a slow combustion range. The catalyst layer 7 on an exhaust gas passage wall of a filter 1 includes a mixture of a Rh-doped Ce-containing composite oxide particle material loaded with Pt and a composite particle material loaded with Pt. In mixed particles of this mixture, Zr-containing composite oxide particles containing no Ce and activated alumina particles are mixed together and agglomerated.

8 Claims, 13 Drawing Sheets

(51) Int. Cl.

| | | |
|---|---|---|
| *B01J 37/03* | (2006.01) | |
| *B01J 35/00* | (2006.01) | |
| *B01J 23/00* | (2006.01) | |
| *B01J 35/02* | (2006.01) | |
| *B01J 35/04* | (2006.01) | |
| *F01N 3/10* | (2006.01) | |
| B01J 23/42 | (2006.01) | |
| B01J 23/46 | (2006.01) | |
| F01N 3/035 | (2006.01) | |

(52) U.S. Cl.
CPC .. *B01D 2255/20715* (2013.01); *B01D 2255/40* (2013.01); *B01D 2255/407* (2013.01); *B01D2258/012* (2013.01); *B01J 23/42* (2013.01); *B01J 23/464* (2013.01); *B01J 2523/00* (2013.01); *F01N 3/035* (2013.01)

(56) References Cited

U.S. PATENT DOCUMENTS

| | | |
|---|---|---|
| 2009/0041637 A1 | 2/2009 | Harada et al. |
| 2009/0099012 A1 | 4/2009 | Suzuki et al. |
| 2009/0232714 A1 | 9/2009 | Abe et al. |
| 2011/0301025 A1* | 12/2011 | Akamine ............ B01J 23/63 502/303 |

FOREIGN PATENT DOCUMENTS

| | | |
|---|---|---|
| JP | 2008-221204 A | 9/2008 |
| JP | 2009-039632 A | 2/2009 |
| JP | 2009-090238 A | 4/2009 |
| JP | 2009-299521 A | 12/2009 |
| JP | 2010-223076 A | 10/2010 |
| JP | 2010-270695 A | 12/2010 |
| WO | 2007/043442 A1 | 4/2007 |

* cited by examiner

REGIONS WHERE COMBUSTION OF SOOT IS NOT FACILITATED BECAUSE OF AGGLOMERATION OF $Al_2O_3$

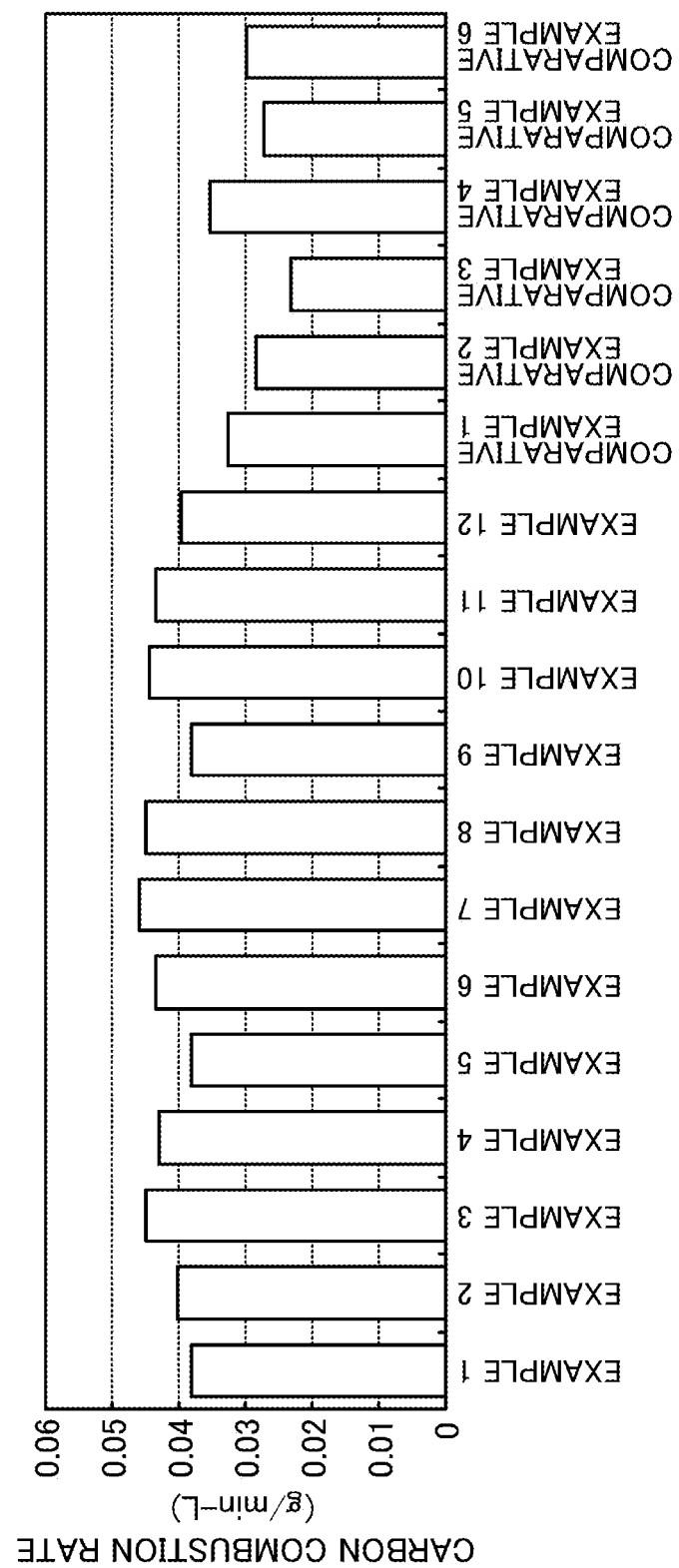

CATALYZED PARTICULATE FILTER

TECHNICAL FIELD

The present invention relates to catalyzed particulate filters which collect particulates emitted from lean burn engines and in which catalysts for removing collected particulates through combustion are loaded on walls of exhaust gas passages.

BACKGROUND ART

Diesel engine vehicles include, in their exhaust gas passages, filters (diesel particulate filters: DPFs) that collect particulates (particulate matter) in exhaust gas, and some of the DPFs are loaded with catalysts. The catalysts are used to promote combustion for removing particulates in order to reuse filters when the amount of particulates accumulated on the filters increases.

Regarding such a catalyzed particulate filter, PATENT DOCUMENT 1 employs a catalyst in which a activated alumina particle material loaded with Pt, a CeZr-based composite oxide (mixed oxide) particle material, and a ZrNd-based composite oxide particle material are mixed together in order to enhance particulate combustibility. PATENT DOCUMENT 2 describes that primary particles of activated alumina, primary particles of Ce-based composite oxide, and primary particles of Zr-based composite oxide are mixed together to form secondary particles in a support, and this support is loaded with catalytic metal in order to promote combustion of particulates. PATENT DOCUMENT 3 shows that Rh and Pt are provided in the crystal lattice or between atoms of composite oxide particles including Ce and Zr and part of Pt is exposed at the surface of the particles in order to lower the combustion temperature of particulates and the temperature at the start of combustion and to prevent sintering of a catalyst precious metal.

CITATION LIST

Patent Documents

PATENT DOCUMENT 1: Japanese Unexamined Patent Publication No. 2009-39632
PATENT DOCUMENT 2: Japanese Unexamined Patent Publication No. 2009-90238
PATENT DOCUMENT 3: Japanese Unexamined Patent Publication No. 2005-329318

SUMMARY OF THE INVENTION

Technical Problem

In a typical particulate combustion catalyst, when a small amount of particulates is accumulated on the surface of a catalyst layer of a filter, these particulates are relatively efficiently removed through combustion. However, as the amount of accumulated particulates increases, the time necessary for removing particulates through combustion tends to increase. Based on the finding from experiments and researches of the inventor of the present invention, this is because of the following reasons.

FIG. 1 is a graph schematically showing a change with time in remaining soot proportion when soot (particulates) accumulated on a catalyst layer is burnt. At first, soot is burnt rapidly. After this rapid combustion range (e.g., an initial stage of combustion in which the remaining soot proportion decreases from 100% to 50%), the combustion shifts to a slow combustion range in which soot is burnt slowly (e.g., a slow combustion stage in which the remaining soot proportion decreases from 50% to 0%). This progress of combustion will now be specifically described.

As shown in the photograph of FIG. 2, at an initial period of combustion, soot is in contact with a thin catalyst layer loaded on the surface of a filter base material. Thus, if the catalyst layer contains Ce-based composite oxide particles, for example, these Ce-based composite oxide particles causes an oxygen exchange reaction in which adjacent oxygen is taken into the particles and activated oxygen is released therefrom. Thus, as schematically illustrated in FIG. 3, highly active internal oxygen is supplied to soot that is in contact with the particle surface. Consequently, soot on the particle surfaces is burnt rapidly.

However, as a result of removal of soot on the surfaces of catalyst particles through combustion, a gap is formed between the catalyst layer and an accumulated soot layer as shown in the photograph of FIG. 4. Thus, as schematically illustrated in FIG. 5, active oxygen released from the inside of particles by the oxygen exchange reaction can maintain its activity only in a short period. However, the activity decreases as active oxygen passes through the gap and, consequently, active oxygen comes to be normal oxygen that is the same as oxygen in a gas phase, for example. As a result, soot is burnt slowly. Of course, as illustrated in the upper left and lower left in FIG. 5, although oxygen in exhaust gas also contributes to combustion of soot, this combustion is slower than combustion with the above-described active oxygen.

It is therefore an object of the present invention is to achieve efficient combustion in both a rapid combustion range and a slow combustion range of particulates accumulated on a catalyst layer.

Solution to the Problem

To achieve the object, according to the present invention, combustion of particulates is promoted by using a Pt-loaded composite particle material in which Pt is loaded on mixed particles of Zr-containing composite oxide and activated alumina and a Rh-doped Ce-containing composite oxide particle material loaded with Pt.

Specifically, a catalyzed particulate filter disclosed herein includes: an exhaust gas passage wall on which particulates in exhaust gas are to be collected; and a catalyst layer located on the exhaust gas passage wall and including Ce-containing composite oxide, Zr-containing composite oxide containing no Ce, activated alumina, and catalytic metals, wherein the catalytic metals include Rh and Pt, the Ce-containing composite oxide included in the catalyst layer is in a state of Rh-doped Ce-containing composite oxide particles doped with Rh as one of the catalytic metals, the Rh-doped Ce-containing composite oxide particles are loaded with Pt as one of the catalytic metals, the Zr-containing composite oxide and the activated alumina included in the catalyst layer are in a state of mixed particles in which Zr-containing composite oxide particles and activated alumina particles are mixed together and agglomerated, the mixed particles are loaded with Pt as one of the catalytic metals, and the Rh-doped Ce-containing composite oxide particles and the mixed particles are mixed such that a mass ratio among the Zr-containing composite oxide, the activated alumina, and the Rh-doped Ce-containing composite oxide is within a range enclosed by point A (18+3/4, 6+1/4, 75), point B (6+1/4, 18+3/4, 75), point C (22+2/9, 66+6/9, 11+1/9), and point D (66+6/9, 22+2/

9, 11+1/9) in a triangular diagram of Zr-containing composite oxide, activated alumina, and Rh-doped Ce-containing composite oxide.

The Ce-containing composite oxide has the oxygen storage/release capacity of storing oxygen in an excess oxygen atmosphere and releasing stored oxygen when the oxygen concentration in the atmosphere decreases and the property of causing the above-described oxygen exchange reaction, and releases active oxygen that effectively contributes to combustion of particulates. Since the Ce-containing composite oxide is doped with Rh, the oxygen storage/release and the oxygen exchange reaction can be promoted. On the other hand, the Zr-containing composite oxide shows a high oxygen ion conduction, causes a similar oxygen exchange reaction, and releases highly active oxygen.

Although a specific mechanism is not known, in the catalyzed particulate filter, under a condition where particulates are in contact with the catalyst layer, the Pt-loaded composite particle material in which mixed particles of Zr-containing composite oxide and activated alumina are loaded with Pt mainly contributes to combustion of particulates, and this combustion is supported by the Rh-doped Ce-containing composite oxide. Under a noncontact condition in which the combustion of particulates in contact with the catalyst layer has progressed and a gap is formed between the catalyst layer and the layer on which are accumulated, Rh-doped Ce-containing composite oxide loaded with Pt is supposed to promote combustion of particulates.

In this case, the mixed particles are an agglomeration of uniformly mixed Zr-containing composite oxide particles and activated alumina particles, and thus, even when particulates come into contact with any portion of the mixed particles, an oxidation effect of the Zr-containing composite oxide promotes combustion of particulates, which is advantageous in early removal of particulates from the filter through combustion. The absence of activated alumina particles having low combustion activity might be effective for combustion of particulates. However, activated alumina particles are still necessary for oxidizing CO generated by incomplete combustion during the combustion of particulates to $CO_2$ and for oxidizing gas components of HC and CO that have not been completely oxidized by an oxidation catalyst. In this premise, the Zr-containing composite oxide and the activated alumina particles are preferably uniformly mixed together. Preferably, the Zr-containing composite oxide particles constituting the mixed particles have an average particle size of 20-100 nm, and the activated alumina particles constituting the mixed particles have an average particle size of 20-100 nm. Then, the Zr-containing composite oxide particles and the activated alumina particles are highly dispersed in the mixed particles, and thus, the probability of contact of particulates with both of the Zr-containing composite oxide particles and the activated alumina particles increases, which is advantageous in early removal of particulates through combustion.

Since the Rh-doped Ce-containing composite oxide particle material loaded with Pt and the composite particle material loaded with Pt are mixed in the catalyst layer, even when particulates come into contact with any portion of the catalyst layer, the Pt-loaded composite particle material can promote combustion of particulates, and this combustion is supported by the Pt-loaded Rh-doped Ce-containing composite oxide particle material. In addition, when the catalyst layer is separated from, i.e., comes to be in a noncontact state with, the layer on which particulates are accumulated, the Pt-loaded Rh-doped Ce-containing composite oxide efficiently contributes to combustion of particulates on this noncontact portion.

In this case, the total combustion rate of particulates under both the contact condition and the noncontact condition is high when the Rh-doped Ce-containing composite oxide particle material and the composite particle material are mixed such that the mass ratio among the Zr-containing composite oxide, the activated alumina, and the Rh-doped Ce-containing composite oxide is within the range enclosed by point A (18+3/4, 6+1/4, 75), point B (6+1/4, 18+3/4, 75), point C (22+2/9, 66+6/9, 11+1/9), and point D (66+6/9, 22+2/9, 11+1/9) in a triangular diagram of Zr-containing composite oxide, activated alumina, and Rh-doped Ce-containing composite oxide.

In particular, the total combustion rate of particulates is high when the mass ratio among the Zr-containing composite oxide, the activated alumina, and the Rh-doped Ce-containing composite oxide is within a range enclosed by point A (18+3/4, 6+1/4, 75), point B (6+1/4, 18+3/4, 75), point E (16+2/3, 50, 33+1/3), and point F (50, 16+2/3, 33+1/3) in the triangular diagram.

A mass ratio Rh/Pt between Rh and Pt as the catalytic metals is preferably greater than or equal to 1/1000 and less than or equal to 1/4. Then, combustion of particulates under the noncontact condition is facilitated. The mass ratio Rh/Pt is more preferably greater than or equal to 1/500 and less than or equal to 1/10.

Regarding the Rh-doped Ce-containing composite oxide particle material loaded with Pt, when the mass ratio Rh/Pt between Rh added to the Ce-containing composite oxide and Pt loaded on the Ce-containing composite oxide is greater than or equal to 1/150 and less than or equal to 1/2, combustion of particulates under the noncontact condition is especially facilitated.

Regarding the Pt-loaded amount in the entire filter, the Pt-loaded amount is preferably less than or equal to 1 g per 1 L of the filter.

Advantages of the Invention

According to the present invention, a Rh-doped Ce-containing composite oxide particle material loaded with Pt and a composite particle material loaded with Pt are mixed together in a catalyst layer on an exhaust gas passage wall of a filter, mixed particles of these materials are a mixture of Zr-containing composite oxide particles containing no Ce and activated alumina particles that are agglomerated, and the mass ratio among Zr-containing composite oxide, activated alumina, and Rh-doped Ce-containing composite oxide is within a range enclosed by point A (18+3/4, 6+1/4, 75), point B (6+1/4, 18+3/4, 75), point C (22+2/9, 66+6/9, 11+1/9), and point D (66+6/9, 22+2/9, 11+1/9) in a triangular diagram of Zr-containing composite oxide, activated alumina, and Rh-doped Ce-containing composite oxide. Thus, combustion of particulates are efficiently promoted under both of a contact condition where particulates are in contact with the catalyst layer and a noncontact condition where a gap is formed between the catalyst layer and a layer on which particulates are accumulated, which is advantageous in easily reusing the filter.

BRIEF DESCRIPTION OF THE DRAWINGS

FIG. 16 is a graph showing soot combustion rates of Examples 1-12 and Comparative Examples 1-6.

DESCRIPTION OF EMBODIMENTS

An embodiment of the present invention will be described with reference to the drawings. Note that the following description of the preferred embodiment is merely illustrative in nature, and is not intended to limit the scope, applications, and use of the invention.

<Structure of Particulate Filter>

Figure 1:
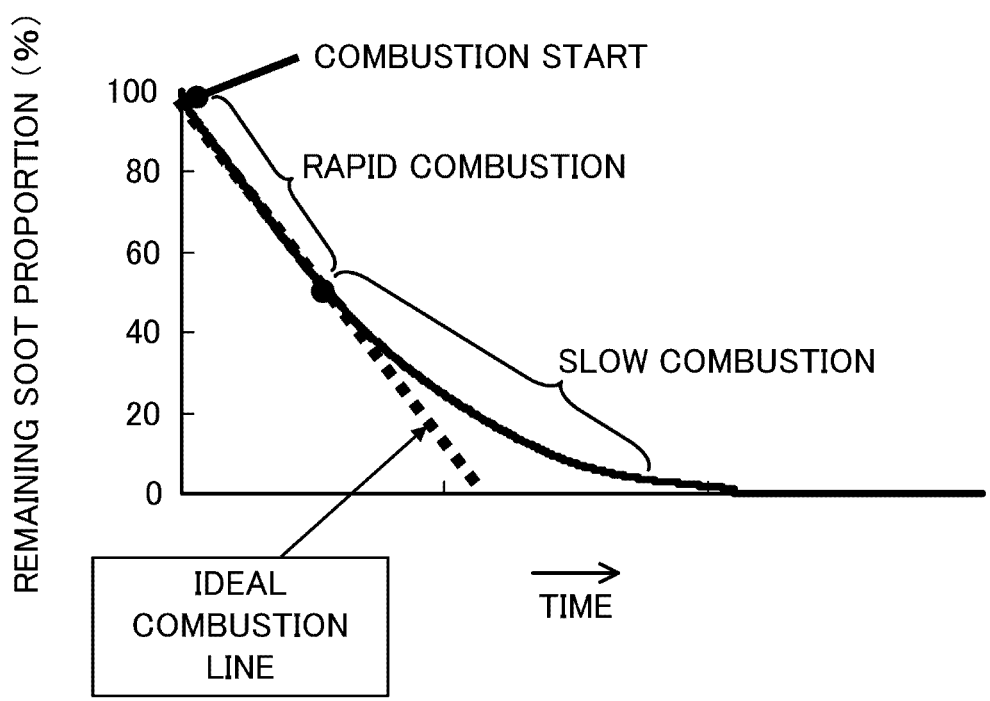
FIG. 1 is a graph schematically showing a change with time in the proportion of remaining soot when soot accumulated on a catalyst layer is burnt.
Figure 2:
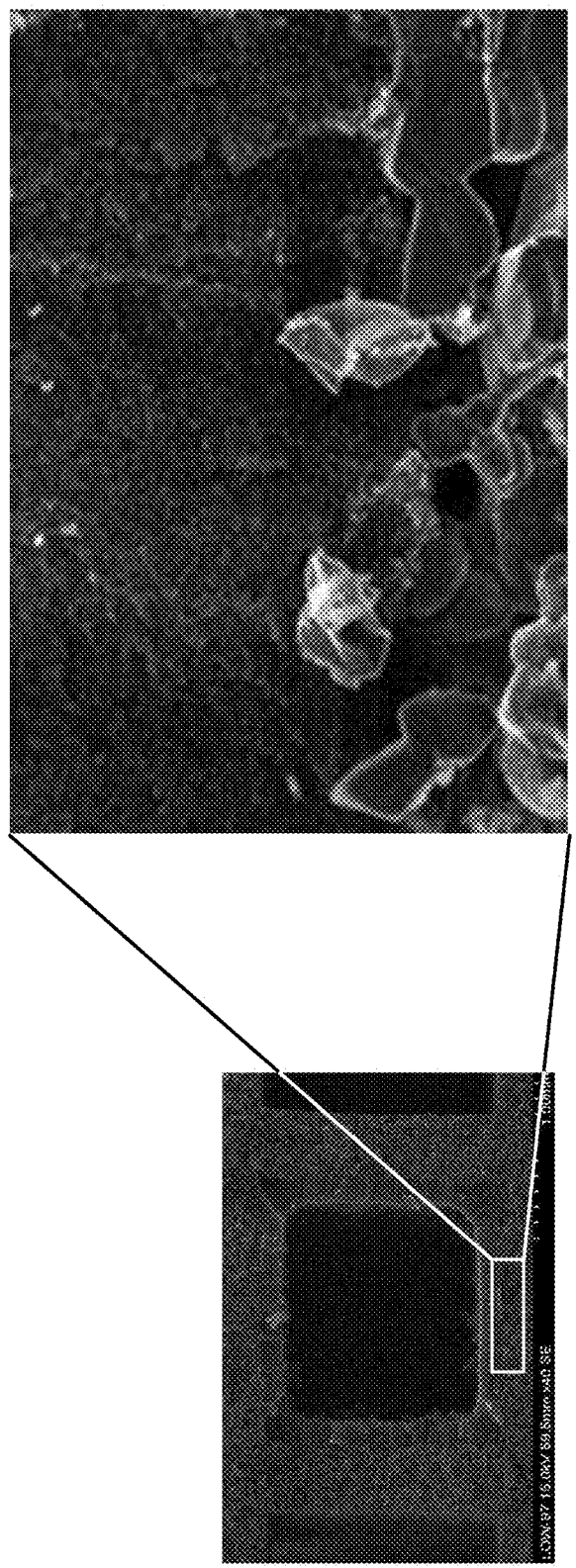
FIG. 2 is a micrograph showing a state in which an accumulated soot layer is in contact with the catalyst layer (i.e., a state in a rapid combustion range in FIG. 1).
Figure 3:
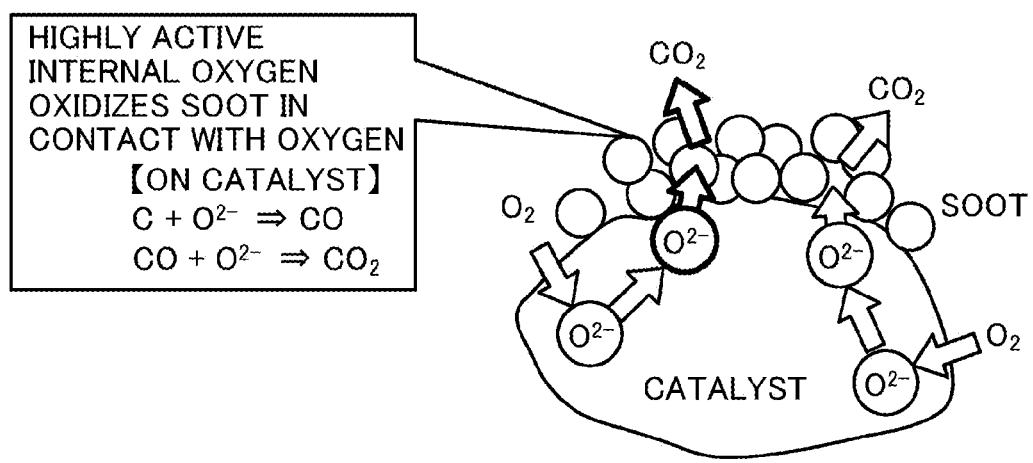
FIG. 3 schematically illustrates a combustion mechanism of soot in the rapid combustion range.
Figure 4:
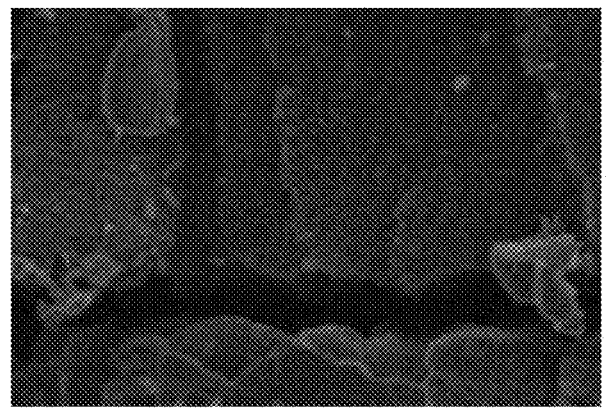
FIG. 4 is a micrograph showing a state in which a gap is formed between the catalyst layer and the accumulated soot layer (i.e., a state in a slow combustion range in FIG. 1).
Figure 5:
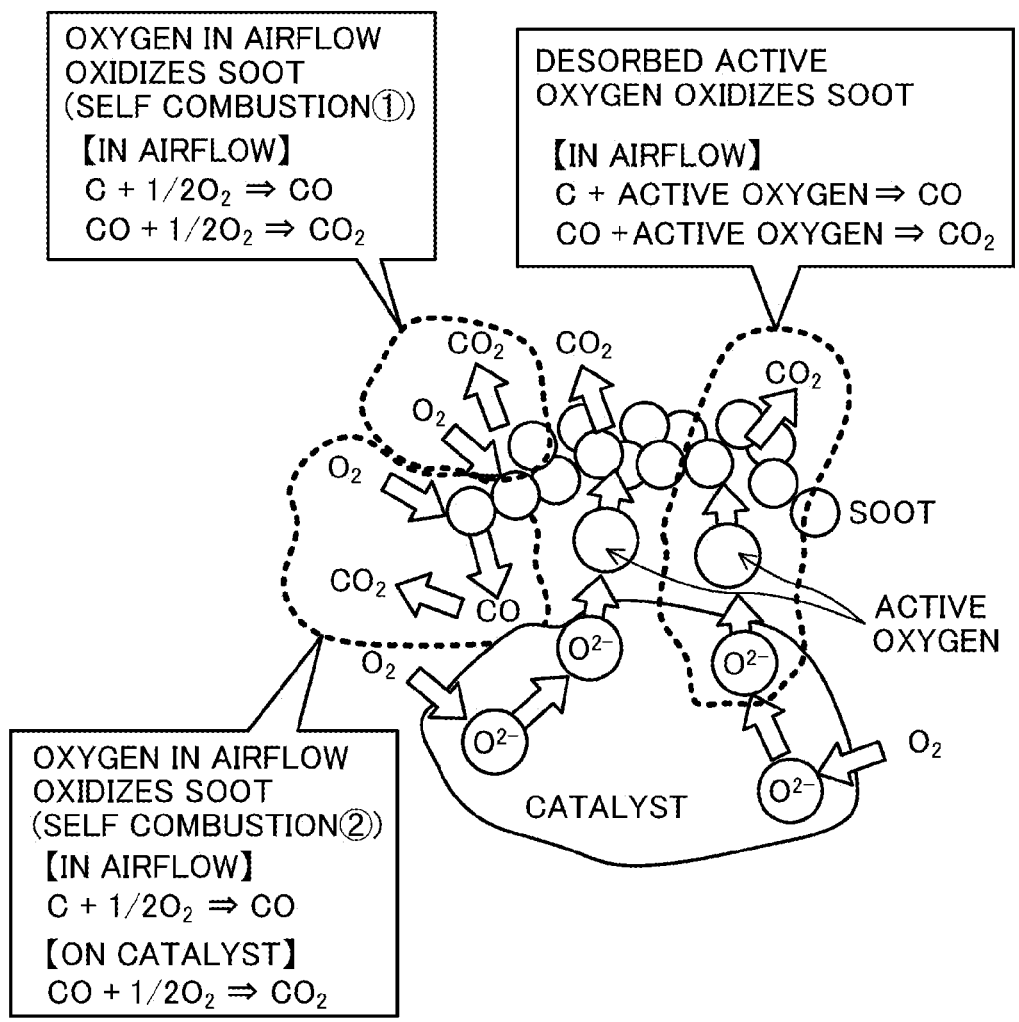
FIG. 5 schematically illustrates a combustion mechanism of soot in the slow combustion range.
Figure 6:
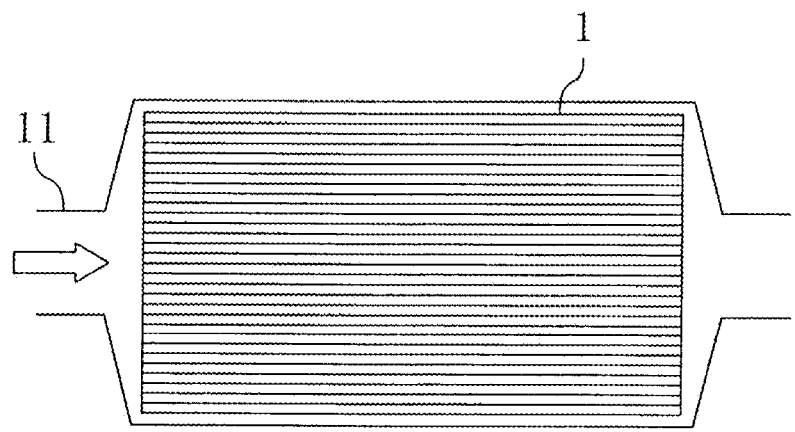
FIG. 6 illustrates a state in which a particulate filter is placed in an exhaust gas passage of an engine.

FIG. 6 illustrates a particulate filter (hereinafter referred to as a "filter") placed in an exhaust gas passage 11 of a diesel engine. An oxidation catalyst (not shown) in which a catalytic metal typified by, for example, Pt and Pd is loaded on a support of, for example, activated alumina can be placed in an exhaust gas passage 11 located upstream of the filter 1 in an exhaust gas flow. In a case where such an oxidation catalyst is placed upstream of the filter 1, HC and CO in exhaust gas are oxidized by the oxidation catalyst, and heat generated during combustion in this oxidation increases the temperature of exhaust gas flowing into the filter 1 and, thereby, heats the filter 1. In this manner, particulates are removed through combustion. In addition, NO is oxidized into $NO_2$ by the oxidation catalyst, and $NO_2$ is supplied to the filter 1 as an oxidizing agent for burning particulates.

Figure 7:
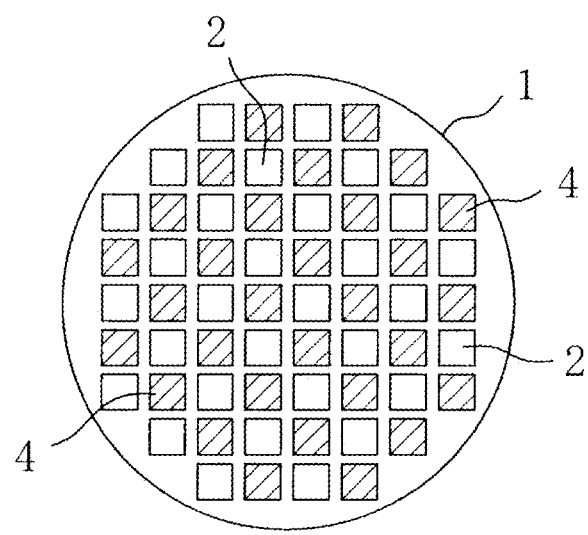
FIG. 7 is a front view schematically illustrating the particulate filter.
Figure 8:
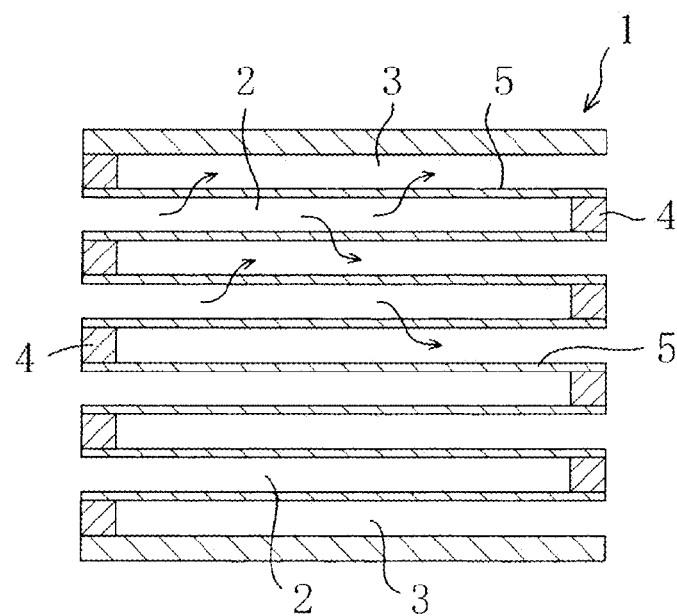
FIG. 8 is a vertical cross-sectional view schematically illustrating the particulate filter.

As schematically illustrated in FIGS. 7 and 8, the filter 1 has a honeycomb structure and includes a large number of parallel exhaust gas passages 2 and 3. Specifically, the filter 1 includes the exhaust gas inlet paths 2 whose downstream ends are blocked by stoppers 4 and the exhaust gas outlet paths 3 whose upstream ends are blocked by stoppers 4. The exhaust gas inlet paths 2 and the exhaust gas outlet paths 3 are alternately arranged and are separated from one another by thin partitions 5. The hatched portions in FIG. 7 indicate the stoppers 4 at the upstream ends of the exhaust gas outlet paths 3.

Figure 9:
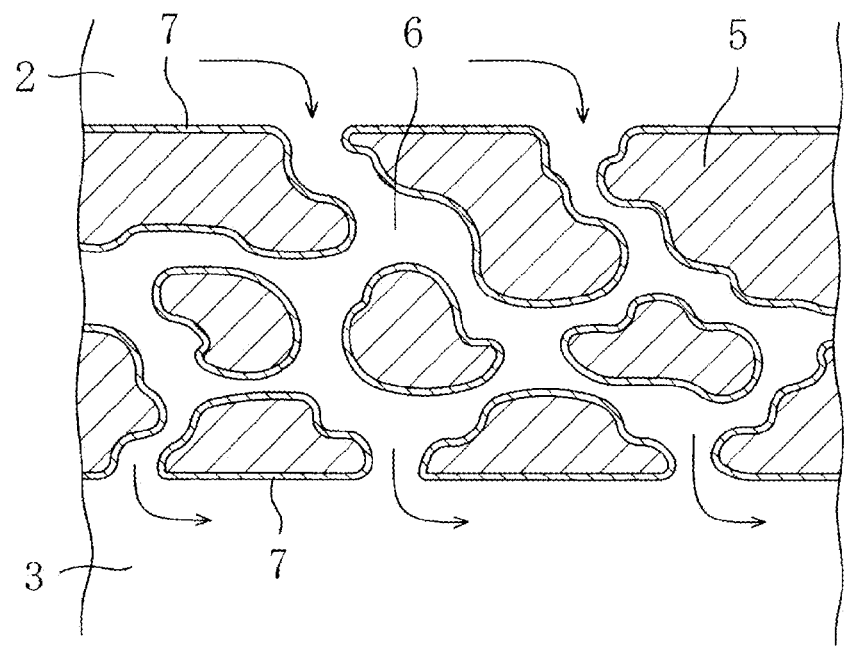
FIG. 9 is an enlarged cross-sectional view schematically illustrating a wall partitioning exhaust gas inlet paths and exhaust gas outlet paths of the particulate filter.

In the filter 1, a filter body including the partitions 5 is made of an inorganic porous material such as cordierite, SiC, $Si_3N_4$, or sialon. Exhaust gas that has flown into the exhaust gas inlet paths 2 passes through the partitions 5 nearby and flows into the adjacent exhaust gas outlet paths 3, as indicated by the allows in FIG. 8. Specifically, as illustrated in FIG. 9, the partitions 5 include pores (exhaust gas passages) 6 allowing the exhaust gas inlet paths 2 to communicate with the exhaust gas outlet paths 3, and exhaust gas passes through the pores 6. Particulates are mainly captured and accumulated on the walls of the exhaust gas inlet paths 2 and the pores 6.

A catalyst layer 7 is formed on wall surfaces constituting the exhaust gas passages (including the exhaust gas inlet paths 2, the exhaust gas outlet paths 3, and the pores 6) of the filter body serving as the base material of the substrate. The catalyst layer does not need to be formed on the walls facing the exhaust gas outlet paths 3.

The catalyst layer 7 includes a Rh-doped Ce-containing composite oxide particle material loaded with Pt and a composite particle material loaded with Pt, as catalytic materials for removing particulates accumulated on the filter 1 through combustion. The mixed particles are mixed particles of Zr-containing composite oxide containing no Ce and activated alumina.

<Catalytic Material>

[Rh-Doped Ce-Containing Composite Oxide Particle Material]

The above-described Rh-doped Ce-containing composite oxide particle material in which the Ce-containing composite oxide is doped with Rh is preferably a Rh-doped CeZr-based composite oxide particle material in which a composite oxide including Ce, Zr, and a rare earth metal (e.g., Nd or Pr) except Ce is doped with Rh. For example, the Rh-doped CeZrNd composite oxide particle material can be prepared by the following method. This Rh-doped CeZrNd composite oxide particle material will be hereinafter referred to as "Rh-doped CZN" when necessary.

—Preparation of Rh-doped CeZrNd Composite Oxide Particle Material—

Cerium nitrate hexahydrate, a zirconyl oxynitrate solution, neodymium nitrate hexahydrate, and a rhodium nitrate solution are dissolved in deionized water. The nitrate solution is mixed with an eight-fold dilution of 28%, by mass, of ammonia water to be neutralized, thereby obtaining a coprecipitate. A solution containing the coprecipitate is subjected to centrifugation so as to remove supernatant liquid (dewatering). Thereafter, deionized water is added to the dewatered coprecipitate, and the resulting coprecipitate is stirred (washed). This dewatering and washing process is repeated the necessary number of times, thereby removing a redundant basic solution. The coprecipitate after final dewatering is dried in the air at 150° C. for 24 hours, is pulverized, and then is calcined in the air at 500° C. for two hours. In this manner, a Rh-doped CeZrNd composite oxide particle material is obtained.

—Particle Size of Rh-Doped CeZrNd Composite Oxide Particle Material—

In the above-described preparation method, a Rh-doped CeZrNd composite oxide particle material having a mole ratio of $CeO_2:ZrO_2:Nd_2O_3=24:72:4$ and a Rh-doping amount of 0.1%, by mass was prepared. An observation of a transmissive electron microscope (TEM) image using a transmissive electron microscope showed that the Rh-doped CeZrNd composite oxide particle material had an average particle size (i.e., "number average particle size," the same holds true hereinafter) of primary particles of about 10 nm, an average particle size of secondary particles of 50-100 nm, and an average particle size of tertiary particles (i.e., particles obtained by pulverizing slurry with a ball grinder so that a catalyst layer is formed on a filter) of 300-400 nm.

[Composite Particle Material of Zr-Containing Composite Oxide and Activated Alumina]

The above-described composite particle material is preferably made of mixed particles in which Zr-containing composite oxide particles with an average particle size of 20-100 nm and activated alumina particles with an average particle size of 20-100 nm are mixed and agglomerated. In this case, a preferable Zr-containing composite oxide is a composite oxide of Zr and a rare earth metal (e.g., at least a metal selected from La, Nd, Y, and Pr) except Ce, and is ZrNdPr composite oxide, for example. The ZrNdPr composite oxide-activated alumina composite particle material will be hereinafter referred to as "ZrNdPrOx-$Al_2O_3$" (where ZrNdPr composite oxide is indicated by "ZrNdPrOx" and activated alumina is indicated by "$Al_2O_3$").

Figure 10:
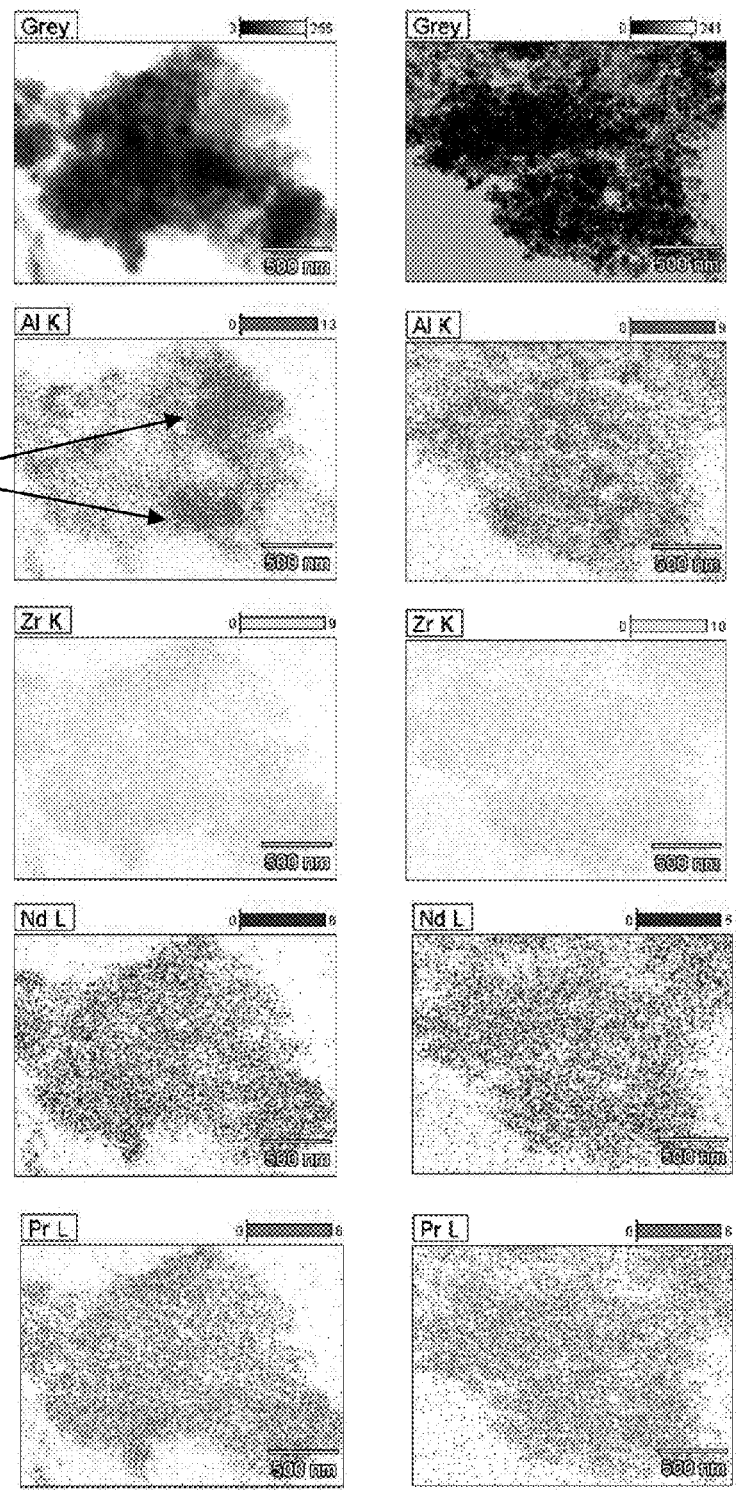
FIG. 10 shows TEM images of a ZrNdPr composite oxide-activated alumina composite particle material and a ZrNdPr composite oxide powder-activated alumina powder physical admixture and mapping images of relative concentration distributions of Al, Zr, Nd, and Pr atoms.

FIG. 10 shows TEM images of a ZrNdPr composite oxide-activated alumina composite particle material and a physical admixture (a mechanical admixture) of ZrNdPr composite oxide powder and activated alumina powder obtained with a transmissive electron microscope and relative concentration distributions of Al, Zr, Nd, and Pr atoms.

Samples for the composite particle material and the physical admixture were obtained by pulverizing slurry with a ball grinder, vacuum-drying the pulverized slurry, and then subjecting the slurry to air aging at 800° C. for 24 hours. Each of the samples has a mass ratio of ZrNdPrOx:$Al_2O_3$=3:1, and the composition of ZrNdPrOx thereof is $ZrO_2$:$Nd_2O_3$:$Pr_2O_3$=70:12:18 (mole ratio).

In the case of the physical admixture (shown at the left in FIG. 10), Al is locally present in some regions and Zr, Nd, and Pr are locally present in other regions. On the other hand, in the case of the composite particle material (shown at the right in FIG. 10), Al, Zr, Nd, and Pr atoms are uniformly dispersed, and even when particulates come into contact with any portion of the composite particle material, combustion of the particulates easily progresses.

Observation of the TEM images with a transmissive electron microscope showed that each of ZrNdPr composite oxide and activated alumina constituting the composite particle material had an average particle size of primary particles of about 10 nm, an average particle size of secondary particles of about 20-100 nm, and an average particle size of tertiary particles (i.e., particles obtained by pulverizing slurry with a ball grinder so that a catalyst layer is formed on a filter) of 300-400 nm.

The composite particle material can be prepared by the following method.

—Method 1—

A zirconyl oxynitrate solution, neodymium nitrate hexahydrate, and praseodymium nitrate are dissolved in deionized water. The obtained nitrate solution is mixed with an eight-fold dilution of 28-mass % ammonia water, and the mixture is neutralized, thereby obtaining a precursor (coprecipitate) of ZrNdPr composite oxide. Similarly, a precursor (precipitate) of activated alumina is obtained by a neutralization process from a solution in which nitric acid aluminium is dissolved in deionized water. The precursor of ZrNdPr composite oxide and the precursor of activated alumina are sufficiently mixed together, and the mixture is dried in the air at 150° C., and pulverized, and then calcined in the air at 500° C. for two hours. In this manner, the composite particle material can be obtained.

—Method 2—

A precursor of ZrNdPr composite oxide and a precursor of activated alumina obtained in a manner similar to method 1 are washed, dried in the air at 150° C., and then pulverized with a ball grinder to each have an average particle size of about 100 nm. Then, these precursors are mixed together, and the mixture is calcined in the air at 500° C. for two hours. In this manner, the composite particle material can be obtained.

—Method 3—

A precursor of ZrNdPr composite oxide obtained by the same neutralization process as that in method 1 is washed, dried in the air at 150° C., calcined at 500° C. for two hours, and then pulverized with a ball grinder to have an average particle size of about 100 nm. Then, a precursor of activated alumina obtained by the same neutralization process as that in method 1 is washed, mixed with the above-described pulverized precursor. The mixture is then dried in the air at 150° C. and calcined at 500° C. for two hours. In this manner, the composite particle material can be obtained.

<Carbon Combustibility Evaluation under Noncontact Condition of Various Ce-Containing Composite Oxides>

[Sample Preparation]

Six types of Ce-containing composite oxide particle materials were prepared as samples.

—Sample A—

Sample A was a CeZrNd composite oxide particle material (loaded with no precious metals), did not include rhodium nitrate, and was prepared in the same manner as the above-described "Rh-doped CeZrNd composite oxide preparation." The composition of CeZrNd composite oxide was $CeO_2$:$ZrO_2$:$Nd_2O_3$=24:72:4 (mole ratio).

—Sample B—

Sample B was a Rh-loaded CeZrNd composite oxide particle material (with a Rh-loaded amount of 0.1%, by mass) and was obtained by preparing a CeZrNd composite oxide particle material in the same manner as that for sample A, and causing Rh to be loaded on a CeZrNd composite oxide particle material by evaporation to dryness using a rhodium nitrate solution. The composition of CeZrNd composite oxide was the same as that of sample A.

—Sample C—

Sample C was a Pt-loaded CeZrNd composite oxide particle material (with a Pt-loaded amount of 3.2%, by mass), and was obtained by preparing a CeZrNd composite oxide particle material in the same manner as that for sample A, and causing Pt to be loaded on a CeZrNd composite oxide particle material by evaporation to dryness using a dinitrodiamine platinum nitrate solution.

—Sample D—

Sample D was a Rh-doped CeZrNd composite oxide particle material (with a Rh-doping amount of 0.1%, by mass) and was prepared by the above-described "Rh-doped CeZrNd composite oxide preparation" method. The composition of CeZrNd composite oxide was the same as that of sample A.

—Sample E—

Sample E was a Rh-loaded Rh-doped CeZrNd composite oxide particle material (with a Rh-loaded amount of 0.1%, by mass and a Rh-doping amount of 0.1%, by mass) and obtained by causing Rh to be loaded on sample D by evaporation to dryness.

—Sample F—

Sample F was a Pt-loaded Rh-doped CeZrNd composite oxide particle material (with a Pt-loaded amount of 3.1%, by mass, and a Rh-doping amount of 0.1%, by mass) and was obtained by causing Pt to be loaded on sample D by evaporation to dryness. A dinitrodiamine platinum nitrate solution was used for the evaporation to dryness.

[Carbon Combustibility Evaluation Method]

Figure 11:
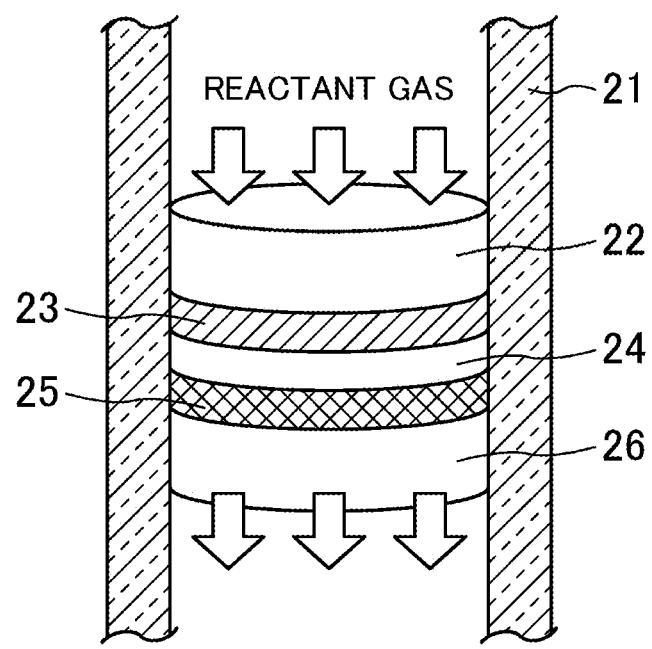
FIG. 11 illustrates a carbon combustibility test device.

Carbon combustibilities of the samples under a noncontact condition were evaluated with a test device illustrated in FIG. 11. In FIG. 11, reference numeral 21 denotes a quartz tube in which model gas flows, and a sample set is placed therein. The sample set is a stack of glass wool 22, a sample pellet 23, a glass wool spacer (with a thickness of 1 mm) 24, carbon black 25, and glass wool 26 that are arranged in this order from upstream to downstream. The glass wool spacer 24 makes the sample pellet 23 and the carbon black 25 to be not in contact with each other (i.e., a noncontact state).

Samples A-F were subjected to aging in the air at 800° C. for 24 hours, and pressed with a pressure of 25 ton, pulverized, screened and adjusted to have a grain size of 100-300 nm, and then inserted to a position indicated by reference numeral 23 in FIG. 11. The sample amount in the pellet 23 was 20 mg, and the carbon amount of the carbon black 25 was 5 mg.

Then, while a He gas is caused to flow in the quartz tube 21, the temperature of the sample set was increased to 580° C., and then the He gas was switched to a 3.5% $^{18}O_2$-containing He gas (at a flow rate of 100 cc/min) under the same temperature. After the switching, CO and $CO_2$ concentrations ($C^{16}O$, $C^{18}O$, $C^{16}O_2$, $C^{16}O^{18}O$, $C^{18}O_2$) downstream of the sample set were measured with a quadrupole mass spectrometer for 600 seconds, and carbon combustion amounts were obtained from the concentrations. Oxygen constituting CeZrNd composite oxide of each of the samples was $^{16}O$.

[Results]

Figure 12:
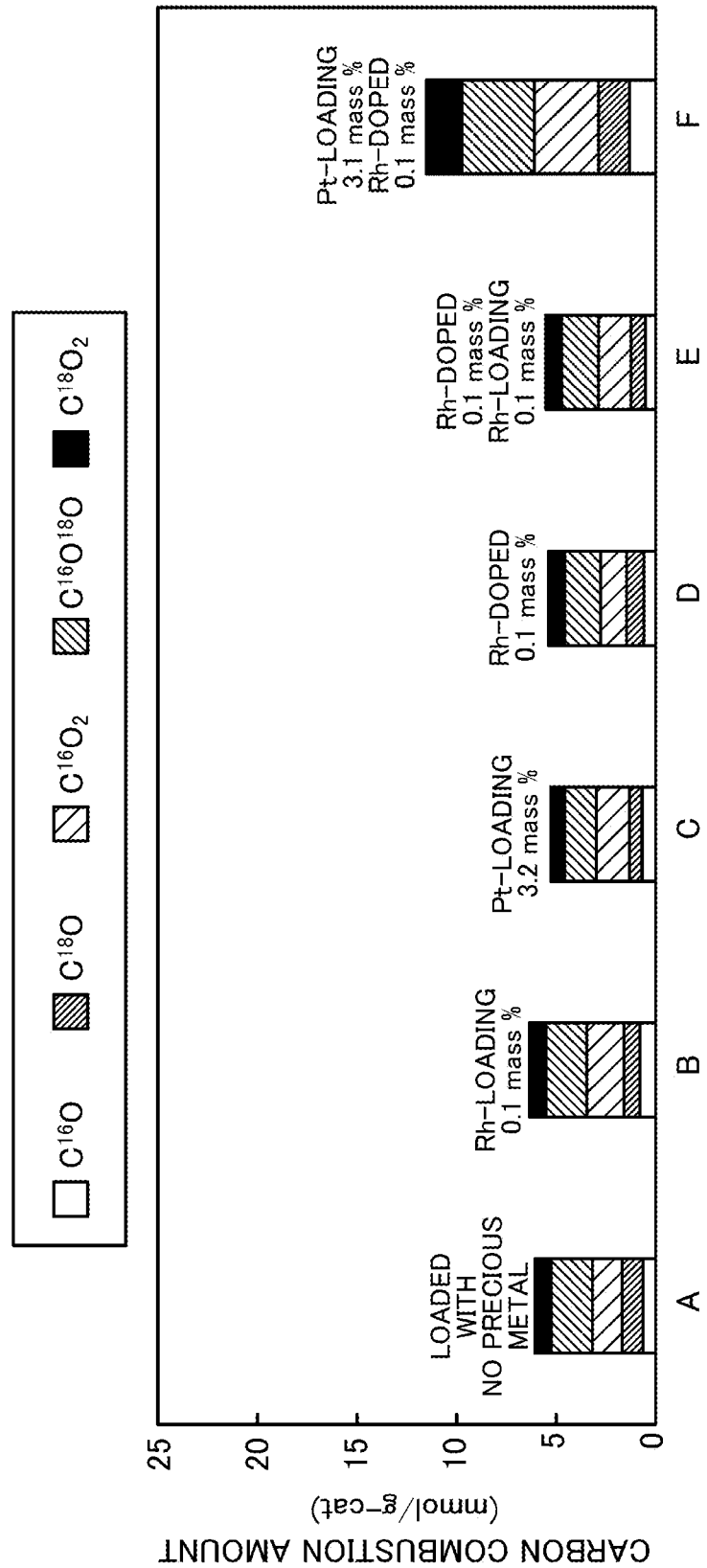
FIG. 12 is a graph showing carbon combustion amounts of samples A-F.

FIG. 12 shows the results. Samples A-E show substantially the same carbon combustion amount. That is, none of Rh doping, Rh loading, and Pt loading, to CeZrNd composite oxide substantially makes the carbon combustibility differ from that in the case of neither doping nor loading of such precious metals. On the other hand, the carbon combustion amount of Pt-loaded Rh-doped CeZrNd composite oxide of sample F is about twice as large as those of the other samples. This shows that Rh doping and Pt loading to CeZrNd composite oxide show a specific effect on carbon combustion under the above-described noncontact condition (i.e., in the above-described slow combustion range (late combustion stage)).

Here, $C^{16}O$ and $C^{16}O_2$ are generated by reaction of $^{16}O$ released from the inside of CeZrNd composite oxide with carbon, and $^{16}O$ of $C^{16}O^{18}O$ is also released from the inside of the CeZrNd composite oxide. This shows that an oxygen exchange reaction occurs in CeZrNd composite oxide. As compared to the other samples, in the sample in which CeZrNd composite oxide doped with Rh and loaded with Pt, a large amount of $^{16}O$ released from the inside of the oxide is supplied to carbon located 1-mm downstream across the glass wool spacer 24 while maintaining it activity, and promotes combustion.

<Relationship Between Rh/Pt Mass Ratio of Sample F and Carbon Combustibility Under Noncontact Condition>

It was examined how the Rh/Pt mass ratio in the Pt-loaded Rh-doped CeZrNd composite oxide particle material of sample F affects carbon combustion under a noncontact condition. Specifically, the total amount of precious metals of Pt and Rh was fixed to 3.2%, by mass, and various Pt-loaded Rh-doped CeZrNd composite oxide particle materials with various Rh-doping amounts and various Pt-loaded amounts were prepared, and the carbon combustion amounts of these materials were obtained by the above-described "carbon combustibility evaluation." The results are shown in Table 1 and FIG. 13.

TABLE 1

| Rh/Pt mass ratio (values in parentheses are indicated as integers or decimal fractions) | Carbon combustion amount (mmol/g-cat) |
|---|---|
| 2/1 (2.000) | 6.00 |
| 1/1 (1.000) | 6.10 |
| 1/2 (0.500) | 6.90 |
| 1/10 (0.100) | 7.90 |
| 1/30 (about 0.033) | 11.45 |
| 1/70 (about 0.014) | 10.50 |
| 1/100 (0.010) | 9.40 |
| 1/150 (about 0.007) | 6.90 |
| 1/200 (0.005) | 5.60 |
| 0 | 6.00 |

Figure 13:
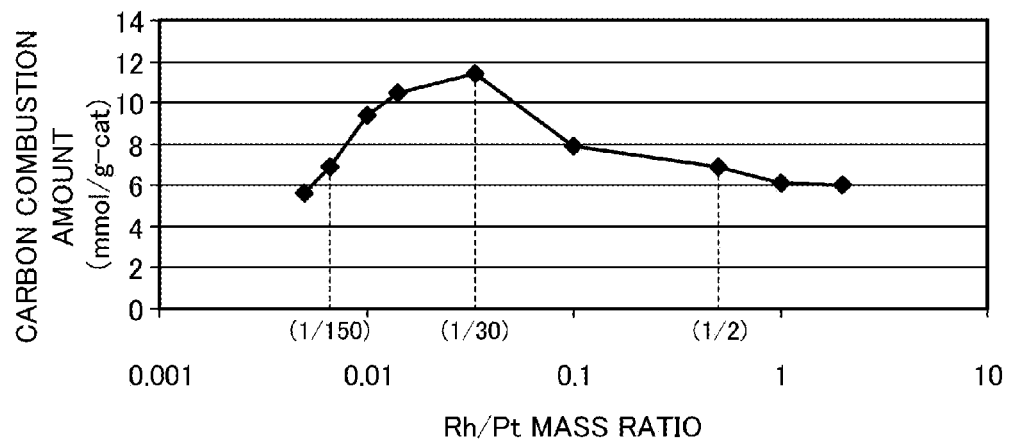
FIG. 13 is a graph showing a relationship between the Rh/Pt mass ratio of Pt-loaded Rh-doped CeZrNd composite oxide and carbon combustibility under a noncontact condition.

A comparison between the results of FIG. 12 and the results of FIG. 13 shows that the carbon combustion amount of sample F is larger than those of samples A-E when the Rh/Pt mass ratio is greater than or equal to 1/150 and less than or equal to 1/2. In particular, when the Rh/Pt mass ratio was 1/30, the carbon combustion amount reaches its maximum.

<Relationship Between Rh/Total Pt Mass Ratio of Catalytic Material and Carbon Combustibility Under Noncontact Condition>

In the present invention, a catalytic material for removing particulates through combustion is a mixture of Ce-containing composite oxide, Zr-containing composite oxide, activated alumina, and Rh and Pt as catalytic metals. A specific example is a catalyst-based material in which a Rh-doped CeZrNd composite oxide particle material and a ZrNdPr composite oxide-activated alumina composite particle material are loaded with Pt. Thus, it was examined how the Rh/total Pt mass ratio affects carbon combustibility under a noncontact condition in this catalyst-based material. Here, the "total Pt" refers to the total amount of Pt loaded on Rh-doped CeZrNd composite oxide and Pt loaded on the composite particle material.

[Basic Structure of Samples]

The mixture ratio is ZrNdPrOx-$Al_2O_3$:Rh-doped CZN=8:1 (mass ratio)

The composition of the composite particle material is ZrNdPrOx:$Al_2O_3$=3:1 (mass ratio)

The composition of Rh-doped CZN except Rh is $CeO_2$:$ZrO_2$:$Nd_2O_3$=24:72:4 (mole ratio)

The composition of ZrNdPrOx is $ZrO_2$:$Nd_2O_3$:$Pr_2O_3$=70:12:18 (mole ratio)

[Preparation of Rh/total Pt Mass Ratio of Samples]

To obtain various Rh/total Pt mass ratios, the Rh-doping amount of the Rh-doped CeZrNd composite oxide particle material, and the Pt-loaded amount (total Pt amount) on the mixture of the Rh-doped CeZrNd composite oxide particle material and the ZrNdPr composite oxide-activated alumina composite particle material were varied. It should be noted that the sum of the Rh-doping amount and the total Pt amount was set at 3.2%, by mass, of the sample amount (the total amount of the Pt-loaded ZrNdPr composite oxide-activated alumina composite particle material and the Pt-loaded Rh-doped CeZrNd composite oxide particle material).

[Measurement and Evaluation of Carbon Combustion Amount]

Figure 14:
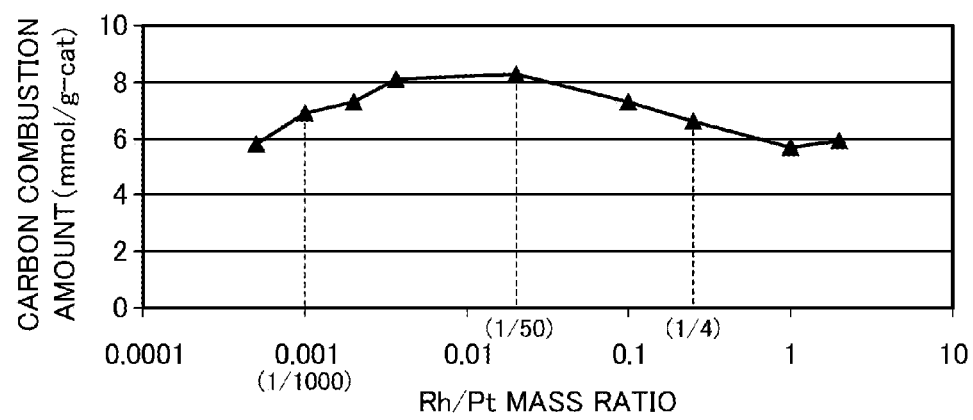
FIG. 14 is a graph showing a relationship between the Rh/total Pt mass ratio of a catalytic material and carbon combustibility under a noncontact condition.

The carbon combustion amounts of the samples with various Rh/total Pt mass ratios were measured by the above-described "carbon combustibility evaluation." The results are shown in Table 2 and FIG. 14.

TABLE 2

| Rh/total Pt mass ratio (values in parentheses are indicated as integers or decimal fractions) | Carbon combustion amount (mmol/g-cat) |
|---|---|
| 2/1 (2.0000) | 5.9 |
| 1/1 (1.0000) | 5.7 |
| 1/4 (0.2500) | 6.6 |
| 1/10 (0.1000) | 7.3 |
| 1/50 (0.0200) | 8.3 |
| 1/275 (about 0.0036) | 8.1 |
| 1/500 (0.0020) | 7.3 |
| 1/1000 (0.0010) | 6.9 |
| 1/2000 (0.0005) | 5.8 |

When the Rh/total Pt mass ratio is greater than or equal to 1/1000 and less than or equal to 1/4, the carbon combustion amount is greater than or equal to 6.5 mmol/g-cat. In particular, when the Rh/total Pt mass ratio is 1/50, the carbon combustion amount reaches its maximum.

Carbon Combustibilities of Catalytic Materials of Examples 1-12 and Comparative Examples 1-6

Structure of Catalytic Material

Examples 1-12

Each of catalytic materials of Examples 1-12 is obtained by loading a Rh-doped CeZrNd composite oxide particle material and a ZrNdPr composite oxide-activated alumina composite particle material with Pt. In each of the catalytic materials, the composition of Rh-doped CeZrNd composite oxide except Rh is $CeO_2:ZrO_2:Nd_2O_3=24:72:4$ (mole ratio), and the Rh-doping amount is 0.1%, by mass, the composition of ZrNdPr composite oxide is $ZrO_2:Nd_2O_3:Pr_2O_3=70:12:18$ (mole ratio), the Pt-loaded amount on the mixture of the Rh-doped CeZrNd composite oxide particle material and the ZrNdPr composite oxide-activated alumina composite particle material is 3.0%, by mass.

As shown in Table 3, the catalytic materials of Examples 1-12 have different mixture ratios between Rh-doped CeZrNd composite oxide and the ZrNdPr composite oxide-activated alumina composite particle material and different compositions of the composite particle material (i.e., the mass ratio between ZrNdPr composite oxide and activated alumina). The different mixture ratios among the catalytic materials result in different Rh contents.

TABLE 3

| | Catalytic material composition | Pt content | Rh content |
|---|---|---|---|
| Example 1 | $ZrNdPrOx \cdot Al_2O_3$:Rh-doped CZN = 8:1<br>$ZrNdPrOx:Al_2O_3$ = 3:1<br>($ZrNdPrOx:Al_2O_3$:Rh-doped CZN = 6:2:1) | 3.0 mass % | 0.011 mass % |
| Example 2 | $ZrNdPrOx \cdot Al_2O_3$:Rh-doped CZN = 2:1<br>$ZrNdPrOx:Al_2O_3$ = 3:1<br>($ZrNdPrOx:Al_2O_3$:Rh-doped CZN = 3:1:2) | 3.0 mass % | 0.033 mass % |
| Example 3 | $ZrNdPrOx \cdot Al_2O_3$:Rh-doped CZN = 1:1<br>$ZrNdPrOx:Al_2O_3$ = 3:1<br>($ZrNdPrOx:Al_2O_3$:Rh-doped CZN = 3:1:4) | 3.0 mass % | 0.050 mass % |
| Example 4 | $ZrNdPrOx \cdot Al_2O_3$:Rh-doped CZN = 1:3<br>$ZrNdPrOx:Al_2O_3$ = 3:1<br>($ZrNdPrOx:Al_2O_3$:Rh-doped CZN = 3:1:12) | 3.0 mass % | 0.075 mass % |
| Example 5 | $ZrNdPrOx \cdot Al_2O_3$:Rh-doped CZN = 8:1<br>$ZrNdPrOx:Al_2O_3$ = 1:1<br>($ZrNdPrOx:Al_2O_3$:Rh-doped CZN = 4:4:1) | 3.0 mass % | 0.011 mass % |
| Example 6 | $ZrNdPrOx \cdot Al_2O_3$:Rh-doped CZN = 2:1<br>$ZrNdPrOx:Al_2O_3$ = 1:1<br>($ZrNdPrOx:Al_2O_3$:Rh-doped CZN = 1:1:1) | 3.0 mass % | 0.033 mass % |
| Example 7 | $ZrNdPrOx \cdot Al_2O_3$:Rh-doped CZN = 1:1<br>$ZrNdPrOx:Al_2O_3$ = 1:1<br>($ZrNdPrOx:Al_2O_3$:Rh-doped CZN = 1:1:2) | 3.0 mass % | 0.050 mass % |
| Example 8 | $ZrNdPrOx \cdot Al_2O_3$:Rh-doped CZN = 1:3<br>$ZrNdPrOx:Al_2O_3$ = 1:1<br>($ZrNdPrOx:Al_2O_3$:Rh-doped CZN = 1:1:6) | 3.0 mass % | 0.075 mass % |
| Example 9 | $ZrNdPrOx \cdot Al_2O_3$:Rh-doped CZN = 8:1<br>$ZrNdPrOx:Al_2O_3$ = 1:3<br>($ZrNdPrOx:Al_2O_3$:Rh-doped CZN = 2:6:1) | 3.0 mass % | 0.011 mass % |
| Example 10 | $ZrNdPrOx \cdot Al_2O_3$:Rh-doped CZN = 2:1<br>$ZrNdPrOx:Al_2O_3$ = 1:3<br>($ZrNdPrOx:Al_2O_3$:Rh-doped CZN = 1:3:2) | 3.0 mass % | 0.033 mass % |
| Example 11 | $ZrNdPrOx \cdot Al_2O_3$:Rh-doped CZN = 1:1<br>$ZrNdPrOx:Al_2O_3$ = 1:3<br>($ZrNdPrOx:Al_2O_3$:Rh-doped CZN = 1:3:4) | 3.0 mass % | 0.050 mass % |
| Example 12 | $ZrNdPrOx \cdot Al_2O_3$:Rh-doped CZN = 1:3<br>$ZrNdPrOx:Al_2O_3$ = 1:3<br>($ZrNdPrOx:Al_2O_3$:Rh-doped CZN = 1:3:12) | 3.0 mass % | 0.075 mass % |

Comparative Examples 1-6

Table 4 shows the catalytic material structures of Comparative Examples 1-6.

A catalytic material of Comparative Example 1 is obtained by loading the ZrNdPr composite oxide particle material with 3.0%, by mass, of Pt.

A catalytic material of Comparative Example 2 is obtained by loading the Rh-doped CeZrNd composite oxide particle material with 3.0%, by mass, of Pt.

A catalytic material of Comparative Example 3 is obtained by loading the activated alumina particle material with 3.0%, by mass, of Pt.

A catalytic material of Comparative Example 4 is obtained by loading a mixture of the ZrNdPr composite oxide particle material and the Rh-doped CeZrNd composite oxide particle material (where the mass ratio is 1:1) with 3.0%, by mass, of Pt.

A catalytic material of Comparative Example 5 is obtained by loading a mixture of the Rh-doped CeZrNd composite oxide particle material and the activated alumina particle material (where the mass ratio is 1:1) with 3.0%, by mass, of Pt.

A catalytic material of Comparative Example 6 is obtained by loading a mixture of the ZrNdPr composite oxide particle material and the activated alumina particle material (where the mass ratio is 1:1) with 3.0%, by mass, of Pt.

TABLE 4

| | Catalytic material composition | Pt content | Rh content |
|---|---|---|---|
| Comparative Example 1 | ZrNdPrOx:Al$_2$O$_3$:Rh-doped CZN = 1:0:0 | 3.0 mass % | 0.000 mass % |
| Comparative Example 2 | ZrNdPrOx:Al$_2$O$_3$:Rh-doped CZN = 0:0:1 | 3.0 mass % | 0.100 mass % |
| Comparative Example 3 | ZrNdPrOx:Al$_2$O$_3$:Rh-doped CZN = 0:1:0 | 3.0 mass % | 0.000 mass % |
| Comparative Example 4 | ZrNdPrOx:Al$_2$O$_3$:Rh-doped CZN = 1:0:1 | 3.0 mass % | 0.050 mass % |
| Comparative Example 5 | ZrNdPrOx:Al$_2$O$_3$:Rh-doped CZN = 0:1:1 | 3.0 mass % | 0.050 mass % |
| Comparative Example 6 | ZrNdPrOx:Al$_2$O$_3$:Rh-doped CZN = 1:1:0 | 3.0 mass % | 0.000 mass % |

Figure 15:
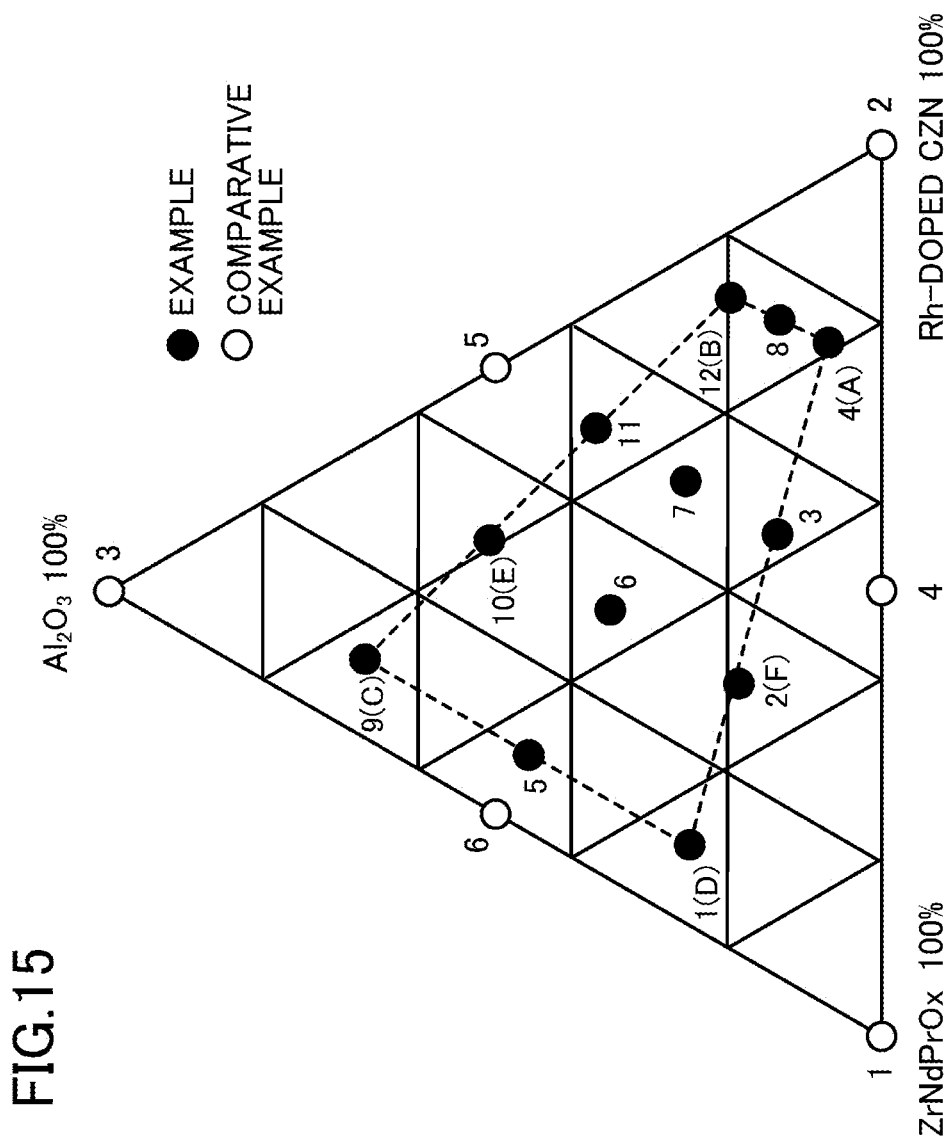
FIG. 15 is a triangular diagram for Examples 1-12 and Comparative Examples 1-6.

FIG. 15 shows a triangular diagram (a triangular diagram) showing mass ratios among ZrNdPr composite oxide (ZrNdPrOx), activated alumina (Al$_2$O$_3$), and Rh-doped CeZrNd composite oxide (Rh-doped CZN) in the catalytic materials of Examples 1-12 and Comparative Examples 1-6.

[Evaluation of Soot Combustibility]

The soot combustion rates with the catalytic materials of Examples 1-12 and Comparative Examples 1-6 were obtained by the following method.

Specifically, filter were loaded with the catalytic materials of Examples 1-12 and Comparative Examples 1-6. As the filter, a SiC honeycomb filter (with a capacity of 2.44 L) having a cell wall thickness of 16 mil (4.064×10$^{-1}$ mm) and including 178 cells per one square inch (645.16 mm$^2$) was employed. The loading amount of a catalytic material per 1 L of the filter was 20 g/L. A filter loaded with the catalytic material was attached to an exhaust pipe of an engine, and the engine was operated, thereby accumulating soot in actual exhaust gas on the filter. From the filter on which soot had been accumulated, 11.3 cc (with a diameter of 17 mm and a length of 50 mm) of sample filters were cut out, and subjected to sealing of exhaust gas passages as illustrated in FIGS. 7 and 8.

The obtained sample filters were attached to a simulation gas distribution reactor, and the gas temperature was increased with distribution of N$_2$ gas. After the filter inlet temperature had been stabilized at 580° C., the N$_2$ gas was switched to simulation exhaust gas (with 7.5% of O$_2$ and residue of N$_2$), and the simulation exhaust gas was caused to flow at a space velocity of 40000/h. Then, the concentrations, in the gas, of CO and CO$_2$ produced by combustion of soot were measured at real time, and from these concentrations, a carbon combustion amount per a unit time was calculated for each time by using the following equation:

Carbon combustion rate (g/h)={gas flow rate (L/h)×
[(CO+CO$_2$) concentration (ppm)/(1×10$^6$)]}×12
(g/mol)/22.4 (L/mol)

In addition, the integrated value of the carbon combustion amount with respect to time was obtained, and from the time until the soot combustion percentage reached 90%, the soot combustion rate (the amount of soot combustion (g/min-L) per one minute with a 1-L filter) was obtained.

FIG. 16 shows the results. Each of Examples 1-12 shows a higher soot combustion rate than Comparative Examples 1-6. Among Examples 1-12, the soot combustion rate of Example 7 is the highest (0.046 g/min-L), followed by Examples 3 and 8 (0.045 g/min-L), Example 10 (0.044 g/min-L), Examples 4, 6, and 11 (0.043 g/min-L), Examples 2 and 12 (0.040 g/min-L), and Examples 1, 5, and 9 (0.038 g/min-L) in this order.

This result shows that the mass ratio among ZrNdPr composite oxide (ZrNdPrOx), activated alumina (Al$_2$O$_3$), and Rh-doped CeZrNd composite oxide is preferably within the range enclosed by point A (18+3/4, 6+1/4, 75) corresponding to Example 4, point B (6+1/4, 18+3/4, 75) corresponding to Example 12, point C (22+2/9, 66+6/9, 11+1/9) corresponding to Example 9, and point D (66+6/9, 22+2/9, 11+1/9) corresponding to Example 1 in the triangular diagram of FIG. 15. The above-described mass ratio is preferably within the range enclosed by point A (18+3/4, 6+1/4, 75), point B (6+1/4, 18+3/4, 75), point E (16+2/3, 50, 33+1/3) corresponding to Example 10, and point F (50, 16+2/3, 33+1/3) corresponding to Example 2.

Further, in the triangular diagram of FIG. 15, the above-described mass ratio is preferably within the range enclosed by point (18+3/4, 6+1/4, 75) corresponding to Example 4, point (37.5, 12.5, 50) corresponding to Example 3, point (33+1/3, 33+1/3, 33+1/3) corresponding to Example 6, point (16+2/3, 50, 33+1/3) corresponding to Example 10, point (12.5, 37.5, 50) corresponding to Example 11, and point (12.5, 12.5, 75) corresponding to Example 8.

Then, the catalytic material of Comparative Example 7 corresponding to Example 1 was additionally prepared, and soot combustion rates of Example 1 and Comparative Example 7 in an initial combustion period (i.e., a period until the soot combustion percentage reaches 50%) and a late combustion stage (i.e., a period in which the soot combustion percentage increases from 50% to 90%) were measured by the above-described "soot combustibility evaluation."

The catalytic material of Comparative Example 7 is obtained by mixing ZrNdPr composite oxide (ZrNdPrOx) powder, activated alumina (Al$_2$O$_3$) powder, and Rh-doped CeZrNd composite oxide powder at a mass ratio of 6:2:1 and loading the mixture with 3.0%, by mass, of Pt. This mass ratio is equal to the mass ratio of three components of Example 1. The compositions of ZrNdPr composite oxide and Rh-doped CeZrNd composite oxide are the same in Example 1 ad Comparative Example 7.

Table 5 shows the results. In each of the initial combustion period (corresponding to the rapid combustion range under a contact condition) and the late combustion stage (corresponding to the slow combustion range under a noncontact condition), Example 1 shows a higher soot combustion rate than Comparative Example 7. The results shown in Table 5 show that the combination of the composite particle material of Zr-containing composite oxide and activated alumina and the Rh-doped Ce-containing composite oxide particle material significantly promotes soot combustion under each of the contact condition and the noncontact condition.

TABLE 5

| | | Soot combustion rate (g/min-L) | |
|---|---|---|---|
| | Catalytic material composition | Initial period | Later period |
| Example 1 | ZrNdPrOx•Al$_2$O$_3$:Rh-doped CZN = 8:1 loaded with Pt ZrNdPrOx:Al$_2$O$_3$= 3:1 (ZrNdPrOx:Al$_2$O$_3$:Rh-doped CZN = 6:2:1) | 0.071 | 0.024 |
| Comparative Example 7 | Mixture of ZrNdPrOx, Al$_2$O$_3$, and Rh-doped CZN loaded with Pt (ZrNdPrOx:Al$_2$O$_3$:Rh-doped CZN = 6:2:1) | 0.039 | 0.011 |

DESCRIPTION OF REFERENCE CHARACTERS 1 filter
2 exhaust gas inlet path (exhaust gas passage)
3 exhaust gas outlet path (exhaust gas passage)
6 pore (exhaust gas passage)
7 catalyst layer

The invention claimed is:

1. A catalyzed particulate filter comprising:
an exhaust gas passage wall on which particulates in exhaust gas are to be collected; and
a catalyst layer located on the exhaust gas passage wall and including Ce-containing composite oxide, Zr-containing composite oxide containing no Ce, activated alumina, and catalytic metals, wherein
the catalytic metals include Rh and Pt,
the Ce-containing composite oxide included in the catalyst layer is in a state of Rh-doped Ce-containing composite oxide particles containing Zr and Nd, doped with Rh as one of the catalytic metals, and having an oxygen storage/release capacity,
the Rh-doped Ce-containing composite oxide particles are loaded with Pt as one of the catalytic metals,
the Zr-containing composite oxide is Zr-containing composite oxide containing Nd and Pr and having an oxygen ion conduction,
the Zr-containing composite oxide and the activated alumina included in the catalyst layer are in a state of mixed particles in which Zr-containing composite oxide particles and activated alumina particles are mixed together and agglomerated,
the mixed particles are loaded with Pt as one of the catalytic metals, and
the Rh-doped Ce-containing composite oxide particles and the mixed particles are mixed such that a mass ratio among the Zr-containing composite oxide, the activated alumina, and the Rh-doped Ce-containing composite oxide is within a range enclosed by point A (18+3/4, 6+1/4, 75), point B (6+1/4, 18+3/4, 75), point C (22+2/9, 66+6/9, 11+1/9), and point D (66+6/9, 22+2/9, 11+1/9) in a triangular diagram of Zr-containing composite oxide, activated alumina, and Rh-doped Ce-containing composite oxide.

2. The catalyzed particulate filter of claim 1, wherein
the Rh-doped Ce-containing composite oxide particles and the mixed particles are mixed such that the mass ratio among the Zr-containing composite oxide, the activated alumina, and the Rh-doped Ce-containing composite oxide is within a range enclosed by point A (18+3/4, 6+1/4, 75), point B (6+1/4, 18+3/4, 75), point E (16+2/3, 50, 33+1/3), and point F (50, 16+2/3, 33+1/3) in the triangular diagram.

3. The catalyzed particulate filter of claim 1, wherein
a mass ratio Rh/Pt between Rh and Pt as the catalytic metals is greater than or equal to 1/1000 and less than or equal to 1/4.

4. The catalyzed particulate filter of claim 2, wherein
a mass ratio Rh/Pt between Rh and Pt as the catalytic metals is greater than or equal to 1/1000 and less than or equal to 1/4.

5. The catalyzed particulate filter of claim 1, wherein
the Zr-containing composite oxide particles constituting the mixed particles have an average particle size of 20-100 nm, and
the activated alumina particles constituting the mixed particles have an average particle size of 20-100 nm.

6. The catalyzed particulate filter of claim 2, wherein
the Zr-containing composite oxide particles constituting the mixed particles have an average particle size of 20-100 nm, and
the activated alumina particles constituting the mixed particles have an average particle size of 20-100 nm.

7. The catalyzed particulate filter of claim 3, wherein
the Zr-containing composite oxide particles constituting the mixed particles have an average particle size of 20-100 nm, and
the activated alumina particles constituting the mixed particles have an average particle size of 20-100 nm.

8. The catalyzed particulate filter of claim 4, wherein
the Zr-containing composite oxide particles constituting the mixed particles have an average particle size of 20-100 nm, and
the activated alumina particles constituting the mixed particles have an average particle size of 20-100 nm.

* * * * *